US012264100B2

(12) United States Patent
Martinage et al.

(10) Patent No.: US 12,264,100 B2
(45) **Date of Patent: *Apr. 1, 2025**

(54) USE OF A CLAY FOR PRODUCING A POZZOLANIC MATERIAL

(71) Applicant: VICAT, Paris la Defense (FR)

(72) Inventors: Olivier Martinage, Lyons (FR); François Hue, Bourgoin Jallieu (FR)

(73) Assignee: VICAT, Paris la Defense (FR)

(*) Notice: Subject to any disclaimer, the term of this patent is extended or adjusted under 35 U.S.C. 154(b) by 723 days.

This patent is subject to a terminal disclaimer.

(21) Appl. No.: 17/262,869

(22) PCT Filed: Aug. 2, 2019

(86) PCT No.: PCT/EP2019/070860

§ 371 (c)(1),
(2) Date: Jan. 25, 2021

(87) PCT Pub. No.: WO2020/025783

PCT Pub. Date: Feb. 6, 2020

(65) Prior Publication Data

US 2022/0363601 A1 Nov. 17, 2022

(30) Foreign Application Priority Data

Aug. 3, 2018 (FR) ...................................... 1857273

(51) Int. Cl.

| | |
|---|---|
| ***C04B 18/02*** | (2006.01) |
| ***C04B 14/06*** | (2006.01) |
| ***C04B 14/10*** | (2006.01) |
| ***C04B 14/30*** | (2006.01) |
| ***C04B 28/04*** | (2006.01) |
| ***C04B 33/13*** | (2006.01) |
| ***C04B 40/00*** | (2006.01) |
| *C04B 103/00* | (2006.01) |

(52) U.S. Cl.
CPC ............ *C04B 18/021* (2013.01); *C04B 14/06* (2013.01); *C04B 14/303* (2013.01); *C04B 14/308* (2013.01); *C04B 28/04* (2013.01); *C04B 33/131* (2013.01); *C04B 40/0042* (2013.01); *C04B 2103/0088* (2013.01)

(58) Field of Classification Search
CPC ....... C04B 14/06; C04B 14/10; C04B 14/106; C04B 14/12; C04B 14/20; C04B 14/28; C04B 14/303; C04B 14/308; C04B 18/021; C04B 20/04; C04B 20/06; C04B 2103/0088; C04B 28/04; C04B 33/131; C04B 40/0042; C04B 7/12
See application file for complete search history.

(56) References Cited

U.S. PATENT DOCUMENTS

| | | | | |
|---|---|---|---|---|
| 9,212,092 B2 * | 12/2015 | Herfort | ................. | C04B 28/065 |
| 10,138,164 B2 * | 11/2018 | Dockx | ................ | C04B 18/0418 |

FOREIGN PATENT DOCUMENTS

| | | | |
|---|---|---|---|
| EA | 200802137 | A1 | 10/2009 |
| EP | 2253600 | A1 | 11/2010 |
| EP | 3078425 | A1 | 10/2016 |
| RU | 2332363 | C2 | 8/2008 |
| RU | 2363678 | C2 | 8/2009 |
| RU | 2369579 | C1 | 10/2009 |
| RU | 2522935 | C1 | 7/2014 |
| RU | 2598102 | C2 | 9/2016 |
| WO | 2004/035490 | A1 | 4/2004 |
| WO | 2006/032786 | A2 | 3/2006 |
| WO | 2007/123996 | A2 | 11/2007 |
| WO | 2014/014888 | A1 | 1/2014 |

OTHER PUBLICATIONS

Taklymi et al., Investigating the properties of bentonite and kaolin modified concrete as a partial substitute to cement, SN Applied Sciences (Year: 2020).*

Beliaev E.V., "Classification of Deposits of Solid Non-Metallic Minerals of the Chechen Republic," pp. 44-56.

Beuntner et al., "Efficiency of calcined clay in cementitious systems," Conference Paper, Oct. 2012, 20 pages.

Bibi et al., "Influence of sandy orland muddy clay additions, on the properties of materials cementing," Materials & Techniques, 2008, pp. 1-8. (with English Abstract).

Snellings et al., "Paper of Rilem TC 282-CCL: mineralogical characterization methods for clay resources intended for use as supplementary cementitious material," Material and Structures, (Jun. 15, 2022), 55:149, 32 pages.

Huenger et al., "On the Reactivity of Calcined Clays from Lower Lusatia for the Production of Durable Concrete Structures," RILEM 2018, pp. 205-211.

Avet, "Investigation of the grade of calcined clays used as clinker substitute in Limestone Calcined Clay Cement (LC3)." Nov. 10, 2017, 169 pages.

Budak et al., "Chemical characterization of Cretan clays for the design of restoration mortars," Microchimica Acta, vol. 162, No. 3-4, pp. 325-331, Aug. 2008.

(Continued)

*Primary Examiner* — Holly Rickman
*Assistant Examiner* — Linda N Chau
(74) *Attorney, Agent, or Firm* — Oliff PLC

(57) ABSTRACT

The use of a clay including: less than 25% of kaolinite; and at least 20% of muscovite and/or illite; the muscovite and/or illite/kaolinite weight ratio being greater than 1, for the preparation of a pozzolanic material.

14 Claims, No Drawings

(56) References Cited

OTHER PUBLICATIONS

He et al., "Thermal stability and pozzolanic activity of calcined illite," Applied Clay Science, vol. 9, pp. 337-354, Feb. 1995.
Fernandez et al., "The origin of the pozzolanic activity of calcined clay minerals: A comparison between kaolinite, illite and montmorillonite," Cement and Concrete Research, vol. 41, No. 1, pp. 113-122, 2011.
Scrivener, "Options for the future of cement," The Indian Concrete Journal, vol. 88, Issue 7, pp. 11-21, Jul. 2014.
Avet et al., "Investigation of the calcined kaolinite content on the hydration of Limestone Calcined Clay Cement (LC3)," Cement and Concrete Research, vol. 107, pp. 124-135, 2018.
Aug. 2, 2019 International Preliminary Report issued in International Patent Application No. PCT/EP2019/070860.
Oct. 4, 2019 International Search Report issued in International Patent Application No. PCT/EP2019/070860.

* cited by examiner

USE OF A CLAY FOR PRODUCING A POZZOLANIC MATERIAL

The present invention relates to the use of a clay for producing a pozzolanic material.

The manufacture of hydraulic binders, and in particular that of cements, essentially consists in calcining a mixture of carefully selected and dosed raw materials, also called «raw-mix». The cooking of this raw-mix gives an intermediate product, the clinker, which, ground with possible mineral additions, will give cement. The type of manufactured cement depends on the nature and proportions of the raw materials as well as the cooking method. There are several types of cements: Portland cements (which represent most of cements produced in the world), aluminous cements (or calcium aluminate), natural quick setting cements, sulfo-aluminous cements, sulfo-belitic cements and other intermediate varieties.

The most common cements are the Portland type cements. Portland cements are obtained from Portland clinker, obtained after clinkering at a temperature in the range of 1450° C. from a raw-mix rich in calcium carbonate in a furnace. The production of one ton of Portland cement is accompanied by the emission of very large amounts of $CO_2$ (about 0.8 to 0.9 tons of $CO_2$ per ton of cement in the case of a CEM I).

Yet, in 2014, the amount of cement sold around the world was around 4.2 billion tons (source: French Trade Union for the Cement Industry—SFIC). This figure, which is constantly increasing, has more than doubled in 15 years. The cement industry is therefore today looking for a valid alternative to Portland cement, that is to say cements having at least the same strength and quality features as Portland cements, but which, during their production, emit less $CO_2$.

During the production of clinker, the main constituent of Portland cement, the release of $CO_2$ is linked to:

- up to 40% for heating the cement kiln, in grinding and in transport;
- up to 60% of so-called chemical, or of decarbonation $CO_2$.

Decarbonation is a chemical reaction that takes place when limestone, the main raw material for making Portland cement, is heated at high temperature. The limestone is then transformed into quick lime and $CO_2$ according to the following chemical reaction:

$$CaCO_3 \rightarrow CaO + CO_2$$

To reduce the $CO_2$ emissions related to the production of Portland cement, several approaches have been considered so far:

- adapting or modernizing cement methods in order to maximize the efficiency of heat exchanges;
- developing new «low carbon» binders such as sulfo-aluminous cements prepared from raw materials less rich in limestone and at a lower cooking temperature, which enables a reduction in $CO_2$ emissions of about 35%;
- or even more (partial) substituting clinker in cements with materials allowing to limit $CO_2$ emissions.

Among the above approaches, that of the (partial) substitution of clinker in cements has been the subject of many developments. Two ways were mainly explored: the substitution of clinker by limestone filler and the substitution of clinker by so-called «pozzolanic» materials The substitution of clinker by limestone filler (that is to say an inactive material) mainly has a diluting effect and is accompanied by a significant drop in resistance, which is very problematic.

However, the substitution of clinker by active or «pozzolanic» materials is accompanied by a much lesser decrease in resistances and for some of them by an increase in these.

A pozzolanic material generally designates any material having «pozzolanic properties», that is to say capable of combining at room temperature and in the presence of water with lime or Portlandite formed during the hydration of the cement to give hydrates with very little solubility likely to generate additional resistance in the long term.

Portland cement is mainly constituted by two types of anhydrous phases: calcium silicates ($C_3S$ and $C_2S$—in which C represents CaO and S represents $SiO_2$) and calcium aluminates ($C_2A$ and $C_4AF$—in which C represents CaO, A represents $Al_2O_3$ and F represents $Fe_2O_3$). It also contains free lime in small amounts.

It is the hydration of the silicate phases which generates the resistances through the formation of hydrates of the gel type: hydrated calcium silicates C—S—H according to the following equations (unbalanced):

$$C_3S + H \rightarrow C\text{—}S\text{—}H + CH$$

$$C_2S + H \rightarrow C\text{—}S\text{—}H + CH$$

in which C represents CaO, S represents $SiO_2$ and H represents $H_2O$.

Portlandite «CH» is a co-product of the hydration of calcium silicates. It represents between 15 and 20 weight % of completely hydrated cement in the case of a CEM I and does not contribute to the resistances.

The pozzolanic material is a source of amorphous and highly reactive silica and/or alumina. When mixed with cement, it will react with portlandite to form new hydrates:

$$A,S + CH \rightarrow C\text{—}A\text{—}S\text{—}H$$

in which A represents $Al_2O_3$, C represents CaO, S represents $SiO_2$ and H represents $H_2O$.

The pozzolanic reaction, slower and later, therefore enables the consumption of portlandite which does not provide resistance to form secondary or late C—S—H generally richer in alumina than C—S—H derived from silicates, generally noted C—A—S—H for this reason. Like C—S—H, C—A—S—H are barely crystallized, or not at all, hydrates which close the porosity and generate an increase in resistance in the longer term.

At the date of the present invention, different pozzolanic materials are used:

- the so-called «natural» pozzolans which are volcanic rocks rich in naturally amorphous silica and alumina;
- fly ash derived from the production of electricity in coal-fired power plants and essentially constituted by silica, alumina and iron oxide;
- silica smoke originating from the reduction of quartz by carbon during the production of silicon and iron/silicon alloys;
- blast-furnace slag, obtained in the steel industry during the production of cast iron, almost entirely amorphous, constituted by silica, alumina but also calcium and magnesium oxide; and
- calcined clays which are synthetic pozzolans obtained by the calcination at 600° C. of kaolinic clays.

Nevertheless, the pozzolanicity of these materials remains variable, and the resistance of construction materials prepared from these pozzolanic materials is sometimes significantly lower than that of construction materials prepared from conventional Portland cements. It therefore remains interesting to identify new pozzolanic materials enabling the preparation of construction materials having a resistance in the medium and long term comparable to that of construction materials prepared from Portland cements, while significantly limiting $CO_2$ emissions during their preparation.

At the date of the present invention, the use of clay for the preparation of synthetic pozzolan by calcination is probably the strategy for reducing the carbon footprint of cements and concretes having the greatest potential. So far, the clays used for the production of pozzolanic material are so-called «kaolinic» clays.

Kaolinite is a clay of the formula $ASH_2$ where A represents alumina $Al_2O_3$, S represents silica $SiO_2$ and H represents water $H_2O$. Its crystallographic structure is organized into sheets of silica and alumina linked together by water molecules.

When kaolinite is brought to a temperature from 500° C. to 700° C., its water molecules are eliminated in the form of water vapor, which has several consequences in terms of structure and reactivity, among which:

- disappearance of the organization in sheets with the consequence of the introduction of a structural disorder (we speak of amorphization);
- very significant increase in the blaine specific surface, which can reach several tens of times that of a conventional cement; and
- appearance of induced pozzolanic activity, that is to say the possibility of reacting with portlandite formed during the hydration of $C_3S$ and $C_2S$ to form new late hydrates.

The calcination of kaolin clays makes it possible to obtain a material classically called «metakaolin». Metakaolin is well known to one skilled in the art and in particular constitutes an addition for concrete recognized by standards in the same way as silica fume.

In her publication «Options for the future of cement», *The Indian Concrete Journal*, July 2014, Vol. 88, Issue 7, pages 11 to 21, Karen L. Scrivener confirms that calcined clay is one of the rare pozzolanic materials present in sufficient quantity to meet demand. The author further makes a direct link between the amount of kaolinite present in the clay and the compressive strength of the construction material finally prepared. According to the results presented by the author, a presence of kaolinite in an amount of 35% to 40% in the clay used to prepare the pozzolanic material (by calcination) appears to be necessary to obtain an acceptable compressive strength of the construction material finally prepared.

Similarly, in its publication «Investigation of the calcined kaolinite content on the hydration of Limestone Calcined Clay Cement (LC3)», *Cement and Concrete Research,* 2018, Vol. 107, pages 124-135, F. Avet has tested clays of very variable nature and mineralogical composition and concludes that there is a direct correlation between the performance of cement («LC3» type therefore containing 30% calcined clay and 15% ground limestone) and high kaolinite contents.

However, the use of pure metakaolin as a pozzolanic material requires significant additions of water, thus increasing the W/C ratio in the construction material and in fact reducing the performances, in particular the mechanical performances, thereof. Furthermore, the metakaolin can only be found in limited amounts and its price is high. It can therefore only be added in limited amounts in construction materials, like the addition of silica fume.

In order to target a strong substitution of cements, in particular Portland, by pozzolans in construction materials, and consequently to obtain a substantial environmental impact, it is therefore still necessary to identify materials likely to be used for the preparation of pozzolanic materials which can themselves be used in high proportion in construction materials.

Yet, it has now been found, quite surprisingly, that clays rich in muscovite and/or illite but having kaolinite contents well below 35% could, once calcined, be used as pozzolanic material in construction materials, and this in large proportions, up to 50% or more of the construction material. The construction materials thus prepared have long-term strength comparable to that of construction materials prepared from conventional Portland cements, and can be prepared with significantly reduced $CO_2$ emissions.

Thus, the present invention relates to the use of a clay comprising:

- less than 25% of kaolinite; and
- at least 20% of muscovite and/or illite;
- the muscovite and/or illite/kaolinite weight ratio being greater than 1;

for the preparation of a pozzolanic material.

Against all expectations, the clays having kaolinite contents well below 35% but rich in muscovite described above can, once calcined, be used as pozzolanic material in construction materials, and in proportions of up to 25% or even 50% of the construction material. The construction materials thus prepared have long-term strength comparable to that of construction materials prepared from conventional Portland cements, and can be prepared with significantly reduced $CO_2$ emissions.

In the context of the present invention:

- the term «clay» means any natural material rich in alumina and silica, essentially consisting of silicates and phylosilicates;
- the term «muscovite» means the mineral of the phylosilicate family of formula $KAl_2$ $(AlSi_3O_{10})$ $(OH, F)_2$;
- the term «illite» means the mineral of the family of phylosilicates of formula $(K, H_3O)$ $(Al, Mg, Fe)_2$ $(Si, Al)_4O_{10}$ $[(OH)_2, (H_2O)]$;
- the term «kaolinite» means the mineral of the phylosilicate family of formula $Al_2Si_2O_5(OH)_4$;
- the term «calcite» means a polymorphous of calcium carbonate $CaCO_3$;
- the term «dolomite» means magnesium carbonate $MgCO_3$;
- the term «microdine» means the mineral of the family of tectosilicates of formula $KAlSi_3O_8$;
- the term «hematite» means iron (III) oxide $Fe_2O_3$;
- the term «amorphous phase» means the non- or poorly diffracting fraction of the material. In X-ray diffraction, only diffracting species can be identified and quantified using the Rietveld method. The comparison of this quantification and of the corresponding chemistry with the actual chemistry of the material makes it possible to quantify the non-diffracting fraction of the material by «difference» by using the method of internal or external standards;
- the term «pozzolanic material» means any material having pozzolanic properties within the meaning of European standard NF EN 197-1, that is to say adapted to be combined at room temperature and in the presence of water with lime or Portlandite formed during the hydration of the cement to give very poorly soluble hydrates capable of generating additional long-term resistance; and the term «construction material» means cement, concrete or mortar.

In the context of the present invention, the median diameter or d50 corresponds to the diameter below which is located 50% of the total mass of the particles of the considered sample. This can be determined by any method known to one skilled in the art, in particular by dry or wet laser granulometry.

Finally, in the context of the present invention, the proportions expressed in % correspond to percentages by weight relative to the total weight of the considered entity.

The present invention therefore relates to the use of a clay having the mineralogical characteristics described above for the preparation of a pozzolanic material. Preferably, the present invention relates to the use of a clay as defined above for the preparation of a pozzolanic material, said clay having the following characteristics, selected alone or in combination:

- the clay contains less than 22% of kaolinite, preferably less than 20% of kaolinite, more preferably less than 18% of kaolinite, most preferably less than 15% of kaolinite;
- clay contains at least 1% of kaolinite;
- the clay contains at least 25% of muscovite and/or illite, more preferably 25% to 50% of muscovite and/or illite, quite preferably 25% to 40% of muscovite and/or illite;
- the muscovite and/or illite/kaolinite weight ratio in the used clay is greater than 1, most preferably greater than 2;
- the clay further contains at least 1% of calcite, preferably at least 2% of calcite, most preferably from 3% to 5% of calcite;
- the clay further contains an amorphous phase containing silica, alumina and/or calcium. Preferably, the clay contains from 20% to 50% of said amorphous phase. More preferably, the clay contains from 30% to 40% of said amorphous phase;
- the clay further contains chlorite, quartz, dolomite, microcline, hematite and/or smectite; and or
- the clay contains less than 25% smectite, preferably less than 20% smectite.

The clay described above can therefore be used to prepare a pozzolanic material by calcination. Thus, the present invention also relates to a method for preparing a pozzolanic material from the clay described above, said method comprising the following steps:

- possible drying and then possible grinding of the clay;
- calcination of the obtained material at a temperature comprised between 650° C. and 900° C.; and
- possible disagglomeration of the obtained calcined clay, for example by grinding, until a median diameter of 10 μm to 20 μm is reached.

During the possible grinding of the clay before calcination, this is preferably carried out with a view to obtain a powder of 100% passing at 2 mm.

The calcination step can be carried out using a rotary calciner, in which it lasts about 30 to 90 minutes. However, a «flash calciner» can also be used to calcine clay to obtain a pozzolanic material, in which case the calcination step is very brief (1 to 2 seconds or less). The fact that a flash calciner can be used allows considerably reducing the energy required for calcination and preparation of the pozzolanic material.

During the possible grinding of the calcined clay, this is carried out until a median diameter less than or equal to 25 μm is reached, more preferably less than or equal to 20 μm, most preferably less than or equal to 15 μm.

The present invention can be illustrated without limitation by the following examples.

EXAMPLE 1—CALCINATION OF CLAY

1.1—Composition of Clay

A crude clay having the mineralogical composition reported in the following Table 1 is used.

TABLE 1

Mineralogical composition of the clay before calcination

| Category | Phase | % (w/w) |
|---|---|---|
| Clays | Muscovite/Illite | 39.8 |
| | Kaolinite | 14.9 |
| | Chlorite | 5.6 |
| | Smectite | 7.9 |
| Carbonates | Calcite | 4.1 |
| | Dolomite | 5.4 |
| Others | Quartz | 12.2 |
| | Hematite | 1 |
| | Albite | 0.4 |
| | Anatase | 2.1 |
| | Microcline | 2.3 |
| | Amorphous | 4.3 |

The above clay has the chemical composition (in % (w/w)) reported in Table 2 below.

TABLE 2

Chemical composition of the clay before calcination

| $SiO_2$ | $Al_2O_3$ | $Fe_2O_3$ | CaO | MgO | $SO_3$ | $K_2O$ | $Na_2O$ | SrO | $TiO_2$ | $P_2O_5$ | MnO | Loss on ignition |
|---|---|---|---|---|---|---|---|---|---|---|---|---|
| 47.79 | 20.94 | 6.16 | 4.24 | 2.90 | 0.08 | 2.75 | 0.26 | 0.02 | 0.99 | 0.08 | 0.04 | 13.83 |

The clay used also has the physical characteristics reported in Table 3 below.

TABLE 3

Physical characteristics of the clay before calcination

| | | |
|---|---|---|
| Density (in g/cm$^3$) | | 2.6 |
| Specific surface | Blaine (in cm$^2$/g) | 2300 |
| | BET (in m$^2$/g) | 43.9 |

1.2—Calcination of Clay

1.2.1—in a Laboratory Furnace

The clay described above is dried for 12 hours at 105° C. and then ground in a ring roll mill to a median diameter of 30 to 40 μm. The powder thus prepared is cooked in a laboratory furnace in batches of 200 g at 800° C. for 1 hour with hot charging and drawing. The calcined clay thus obtained (calcined clay AC-1) is again ground slightly in a in a planetary mill (15 seconds, 700 rpm) to deagglomerate it and obtain a median diameter of 20 μm.

1.2.2—in a Flash Calciner

The clay described above is dried for 72 hours at 105° C. and then crushed in a jaw crusher until 100% passing to 2 mm is obtained. The powder thus prepared is then calcined in a flash calciner at 625° C. (calcined clay ACF-1), 780° C. (calcined clay ACF-2), 870° C. (calcined clay ACF-3) or 875° C. under atmosphere reducing agent (calcined clay ACF-4) with an average residence time of 1 to 2 seconds. The calcined clay thus obtained is then ground again in a vertical mill to deagglomerate it and obtain a median diameter of 10-11 μm.

The calcined clays thus obtained are analyzed. The mineralogical composition (in % (w/w)) thereof is reported in Table 4 below.

TABLE 4

| Mineralogical composition of calcined clays ACF-1 to ACF-4 | | | | | |
|---|---|---|---|---|---|
| Category | Phase | ACF-1 | ACF-2 | ACF-3 | ACF-4 |
| Clays | Muscovite/Illite | 26.4 | 24.8 | 17.6 | 17.2 |
| | Kaolinite | 5.8 | 2.5 | — | — |
| | Chlorite | 3.1 | — | — | — |
| Carbonates | Calcite | 3.3 | 3 | 1.7 | 2.1 |
| | Dolomite | 1.1 | 0.2 | — | — |
| Others | Quartz | 10.7 | 11.8 | 12.1 | 11.9 |
| | Hematite | 1.7 | 1.8 | 1.9 | 1.6 |
| | Microcline | 4.2 | 3.5 | 2.3 | 2.3 |
| | Free lime | — | 0.5 | 0.5 | 0.4 |
| | Periclase | — | 0.5 | 0.4 | 0.4 |
| Amorphous | | 43.8 | 51.3 | 63.4 | 64 |

EXAMPLE 2—MORTAR COMPOSITIONS

Preparation of Mortars 1 to 16

A reference mortar (hereinafter Mortar 1) is prepared from Portland cement CEM I 52.5 R according to standard EN 196-1. The composition of mortar 1 is as follows:

450 g of CEM I 52.5 R cement;

1350 g of standardized sand; and 225 g of water.

Similarly, mortars 2 to 15 are respectively prepared from a mixture:

- 90% of CEM I 52.5 R/10% of AC-1 (mortar 2);
- 80% of CEM I 52.5 R/20% of AC-1 (mortar 3);
- 70% of CEM I 52.5 R/30% of AC-1 (mortar 4);
- 60% of CEM I 52.5 R/40% of AC-1 (mortar 5);
- 83% of CEM I 52.5 R/17% of AC-1 (mortar 6);
- 83% of CEM I 52.5 R/(8.5% of AC-1 and 8.5% of limestone filler) (mortar 7);
- 83% CEM I 52.5 R/17% limestone filler (mortar 8);
- 75% of CEM I 52.5 R/25% of AC-1 (mortar 9);
- 75% CEM I 52.5 R/25% limestone filler (mortar 10);
- 50% of CEM I 52.5 R/50% of AC-1 (mortar 11);
- 50% of CEM I 52.5 R/(33% of AC-1 and 17% of limestone filler) (mortar 12);
- 50% of CEM I 52.5 R/(25% of AC-1 and 25% of limestone filler) (mortar 13);
- 50% of CEM I 52.5 R/(17% of AC-1 and 33% of limestone filler) (mortar 14); and
- 50% CEM I 52.5 R/50% limestone filler (mortar 15);

the other ingredients and their proportions remaining unchanged.

Finally, mortar 16 is prepared from a mixture of 75% CEM I 52.5 R/25% commercial calcined clay (Argicem®), the other ingredients and their proportions remaining unchanged.

Mechanical Strength

The mechanical strength of the mortars is measured in accordance with standard EN 196-1 on prismatic mortar test specimens 4×4×16 $cm^3$ prepared at 20° C.

The activity index characterizes the performance of the pozzolanic material when it is used at x % substitution. It is defined as the ratio of the compressive strengths (measured as indicated hereinabove) of a cement mortar constituted by 100-x % of a reference cement (CEM I) and x % of the considered pozzolanic addition, and of a mortar prepared with 100% of reference cement.

$$AI(\%) = \frac{CS \text{ cement substituted at } x\%}{CS \text{ Reference}}$$

The results of the compressive strength (CS) measurements are reported in the following Tables 5 and 6.

TABLE 5

| Compressive strengths | | | | | | | | | |
|---|---|---|---|---|---|---|---|---|---|
| | | Mortar 1 (ref.) | Mortar 2 | Mortar 3 | Mortar 4 | Mortar 5 | Mortar 6 | Mortar 7 | Mortar 8 |
| Compressive | 2 days | 46.6 | 42.5 | 36.5 | 32.6 | 27.8 | 38.7 | 39.5 | 40.1 |
| strength | 7 days | 55.9 | 51.6 | 46.2 | 42.7 | 38.0 | 50.1 | 52.4 | 49.1 |
| (MPa) | 28 days | 60.5 | 57.6 | 56.6 | 51.2 | 46.4 | 58.0 | 59.1 | 57.6 |
| Activity | 2 days | — | 91.3 | 78.3 | 69.9 | 59.8 | 83.0 | 84.8 | 86.1 |
| index | 7 days | — | 92.3 | 82.6 | 76.3 | 67.9 | 89.6 | 93.7 | 87.8 |
| (in %) | 28 days | — | 95.2 | 93.6 | 84.6 | 76.7 | 95.9 | 97.7 | 95.2 |

TABLE 6

| Compressive strengths | | | | | | | | | |
|---|---|---|---|---|---|---|---|---|---|
| | | Mortar 9 | Mortar 10 | Mortar 11 | Mortar 12 | Mortar 13 | Mortar 14 | Mortar 15 | Mortar 16 |
| Compressive | 2 days | 34.6 | 35.8 | 21.1 | 22.4 | 22.3 | 21.0 | 19.4 | 31.5 |
| strength | 7 days | 44.7 | 45.0 | 32.7 | 36.1 | 33.6 | 31.3 | 25.4 | 45.9 |
| (MPa) | 28 days | 54.6 | 50.4 | 40.0 | 41.1 | 39.5 | 36.9 | 27.8 | 54.6 |
| Activity | 2 days | 74.2 | 76.8 | 45.3 | 48.1 | 47.9 | 45.1 | 41.6 | 67.6 |

TABLE 6-continued

| Compressive strengths | | | | | | | | | |
|---|---|---|---|---|---|---|---|---|---|
| | | Mortar 9 | Mortar 10 | Mortar 11 | Mortar 12 | Mortar 13 | Mortar 14 | Mortar 15 | Mortar 16 |
| index | 7 days | 80.0 | 80.5 | 58.5 | 64.6 | 60.1 | 56.0 | 45.4 | 82.1 |
| (in %) | 28 days | 90.2 | 83.3 | 66.1 | 67.9 | 65.3 | 61.0 | 46.0 | 90.2 |

It appears that the mortar prepared from a binary mix Portland cement/calcined clay in a laboratory furnace (mortars 2 to 6, 9 and 11) have a mechanical strength at 28 days comparable to that of the mortar prepared from the Portland cement alone (mortar 1) and comparable or even higher than that of the mortar prepared from a mixture of Portland cement/commercial calcined clay to 25% substitution. In addition, it appears that the addition of calcined clay in laboratory furnace has a dilution effect by lowering the mechanical strength at 28 days.

The results obtained for the mortars prepared from a binary mix Portland cement/limestone filler (mortar 8, 10 and 15) or from a ternary mixture of Portland cement/(calcined clay in a laboratory furnace+limestone filler) (mortars 7 and 12 to 14) highlight the positive effect to the presence of the calcined clay on the mechanical strength at 28 days, especially at the higher degree of substitution.

EXAMPLE 3—MORTAR COMPOSITIONS

Preparation of Mortars 17 to 21

As in Example 2, mortars 17 to 21 are prepared from a mixture CEM I 52.5 R/clay in the following proportions:

75% CEM I 52.5 R/25% ACF-1 (mortar 17);

75% CEM I 52.5 R/25% ACF-2 (mortar 18);

75% CEM I 52.5 R/25% ACF-3 (mortar 19);

75% CEM I 52.5 R/25% ACF-4 (mortar 20); and

55% CEM I 52.5 R/(30% ACF-4 and 15% limestone filler) (mortar 21);

the other ingredients and their proportions remaining unchanged.

Mechanical Strength

The mechanical strength of mortars is measured on prismatic mortar test specimens 4×4×16 $cm^3$ prepared at 20° C. in accordance with standard EN 196-1.

The activity index characterizes the performance of the pozzolanic material when it is used at x % substitution. It is defined as the ratio of the compressive strengths (measured as indicated hereinabove) of a cement mortar constituted by 100-x % of a reference cement (CEM I) and x % of the considered pozzolanic addition, and of a mortar prepared with 100% of reference cement.

$$AI(\%) = \frac{CS \text{ cement substituted at } x\%}{CS \text{ Reference}}$$

The results of the compressive strength (CS) measurements are reported in Table 7 below.

TABLE 7

| Compressive strengths | | | | | | | | |
|---|---|---|---|---|---|---|---|---|
| | | Mortar 1 (ref.) | Mortar 16 | Mortar 17 | Mortar 18 | Mortar 19 | Mortar 20 | Mortar 21 |
| Compressive | 2 days | 43.9 | 31.5 | 30.8 | 33.7 | 33.4 | 33.5 | 24.7 |
| strength | 7 days | 53.6 | 45.9 | 43.7 | 46.4 | 47.5 | 47.5 | 46.0 |
| (MPa) | 28 days | 61.8 | 54.6 | 52.5 | 56.2 | 62.0 | 64.7 | 56.0 |
| Activity | 2 days | — | 67.6 | 70.2 | 76.8 | 76.1 | 76.3 | 56.3 |
| index | 7 days | — | 82.1 | 81.5 | 86.6 | 88.6 | 88.6 | 85.8 |
| (in %) | 28 days | — | 90.2 | 85.0 | 90.9 | 100.3 | 104.7 | 90.6 |

It appears that the mortars prepared from a binary mixture of 75% Portland cement/25% calcined clay in a flash calciner (mortars 17 to 20) have a mechanical strength at 28 days comparable or even higher (depending on the calcination temperature) than that of the mortar prepared from Portland cement alone (Mortar 1) or from a Portland cement/commercial calcined clay mixture.

The results obtained for the mortar prepared from a ternary mixture of Portland cement/(clay calcined in a flash calciner+limestone filler) (mortar 21) show that it is possible to reduce the amount of Portland cement used by 45% with less 10% loss of compressive strength at 28 days.

The invention claimed is:

1. A method for preparing a pozzolanic material, consisting essentially of optionally drying a pre-calcined clay, wherein the pre-calcined clay comprises:

less than 25% by weight of kaolinite, at least 20% by weight of at least one of muscovite and illite, wherein the at least one of muscovite and illite has the highest content of all minerals in the pre-calcined clay, and wherein a weight ratio of the at least one of muscovite and illite to the kaolinite is greater than 1, following any optional drying, optionally grinding the pre-calcined clay until the pre-calcined clay has a median diameter less than or equal to 25 μm, calcining the pre-calcined clay to obtain a calcined clay, and optionally disagglomerating the calcined clay until a median diameter of 10 μm to 20 μm is reached.

2. The method according to claim 1, wherein the pre-calcined clay contains less than 22% by weight of kaolinite.

3. The method according to claim 2, wherein the pre-calcined clay contains less than 20% by weight of kaolinite.

4. The method according to claim 1, wherein the pre-calcined clay contains at least 1% by weight of kaolinite.

5. The method according to claim 1, wherein the pre-calcined clay contains at least 25% by weight of the at least one of muscovite and illite.

6. The method according to claim 5, wherein the pre-calcined clay contains 25% to 50% by weight of the at least one of muscovite and illite.

7. The method according to claim 1, wherein the weight ratio of the at least one of muscovite and illite to the kaolinite is greater than 2.

8. The method according to claim 1, wherein the pre-calcined clay further contains at least 1% by weight calcite.

9. The method according to claim 1, wherein the pre-calcined clay further contains an amorphous phase containing one or more of silica, alumina and calcium.

10. The method according to claim 1, wherein the pre-calcined clay further contains one or more of chlorite, quartz, dolomite, microcline, hematite and smectite.

11. The method according to claim 1, wherein the calcination is conducted at a temperature of from 650° C. to 900° C.

12. The method according to claim 1, wherein the calcination is conducted in a rotary calciner for about 30 to 90 minutes.

13. The method according to claim 1, wherein the calcination is conducted in a flash calciner for about 2 seconds or less.

14. A method for preparing a pozzolanic material, comprising calcination of a material consisting of clay, wherein the clay is a natural material consisting essentially of silicates and phylosilicates and wherein the clay prior to calcination (pre-calcined clay) includes:

less than 25% by weight of kaolinite, at least 20% by weight of at least one of muscovite and illite, wherein the at least one of muscovite and illite has the highest content of all minerals in the pre-calcined clay, and wherein a weight ratio of the at least one of muscovite and illite to the kaolinite is greater than 1.

* * * * *